United States Patent [19]

Hodgson

[11] Patent Number: 5,009,817
[45] Date of Patent: Apr. 23, 1991

[54] URANIUM DIOXIDE PRODUCTION

[75] Inventor: Graham Hodgson, Blackpool, United Kingdom

[73] Assignee: British Nuclear Fuels plc, Warrington, England

[21] Appl. No.: 378,983

[22] Filed: Jul. 11, 1989

[30] Foreign Application Priority Data

Sep. 9, 1988 [GB] United Kingdom ............... 8821192

[51] Int. Cl.$^5$ .................. G21C 21/00; C01G 43/02
[52] U.S. Cl. .................. 264/0.5; 423/261; 501/152
[58] Field of Search .............. 423/261; 264/0.5; 501/152

[56] References Cited

U.S. PATENT DOCUMENTS

| | | | |
|---|---|---|---|
| 3,547,598 | 12/1970 | Knudsen | 423/261 |
| 3,641,227 | 2/1972 | Horsley et al. | 423/261 X |
| 4,053,559 | 10/1977 | Hart et al. | 423/261 |
| 4,112,055 | 9/1978 | Artaud | 423/261 |

FOREIGN PATENT DOCUMENTS 62-27331 2/1987 Japan .

OTHER PUBLICATIONS

*Uranium Dioxide: Properties and Nuclear Applications,* Ed. by J. Belle, Naval Reactors, Div. of Reactor Development, U.S. Atomic Energy Commission, U.S. Gov't Printing Office, 1961, pp. 33, 68–69, 73–74.

*Primary Examiner*—Edward A. Miller
*Assistant Examiner*—Ngoclan T. Mai
*Attorney, Agent, or Firm*—William R. Hinds

[57] ABSTRACT

Ceramic uranium dioxide is produced from uranium metal by steam oxidation of the metal, followed by oxidation in air to produce $U_3O_8$, and subsequent reduction in hydrogen of the $U_3O_8$ to produce $UO_2$. The steam environment may be between 250° C. and 500° C., the oxygen-containing environment at 700° C. or below, and the reducing environment at 600° C. or below.

12 Claims, No Drawings

URANIUM DIOXIDE PRODUCTION

This invention relates to the production of uranium dioxide, and more particularly to the production of ceramic uranium dioxide.

According to the present invention there is provided a process for the production of a ceramic material comprising sinterable uranium dioxide, the process comprising initially oxidizing uranium metal in a flowing steam/inert gas environment at a temperature between 250° C. and 500° C. to produce substantially uranium dioxide, the proportions of the steam and the inert gas in said environment and the flow rate thereof being arranged so that the formation of $U_3O_8$ is inhibited, then further oxidizing the steam-oxidized metal in an oxygen-containing environment at a temperature not exceeding 700° C. to produce $U_3O_8$, and subsequently reducing the $U_3O_8$ in a reducing environment at a temperature not exceeding 600° C. to produce a ceramic material comprising sinterable uranium dioxide.

The steam environment preferably is about 350° C. The oxygen-containing environment preferably is about 450° C. The reducing environment preferably is about 500° C. Advantageously, the process is performed at atmospheric pressure.

The steam environment might include an inert gas such as nitrogen.

The oxygen-containing environment might comprise an $O_2/N_2$ gas mixture.

The ceramic grade uranium dioxide produced by the process of the invention has a morphology that provides a sinterable material capable of being formed into pellets of nuclear fuel. The invention therefore also includes ceramic uranium dioxide made by the process of the invention, and further includes fuel pellets incorporating said ceramic uranium dioxide.

It will be understood that as used herein the term "uranium dioxide or $UO_2$" is not restricted to stoichiometric $UO_2$, but includes non-stoichiometric uranium dioxide. Similarly, $U_3O_8$ includes non-stoichiometric $U_3O_8$, and uranium metal includes metal that has been partly oxidized, for example by prolonged exposure to air.

The invention will now be further described by way of example only with reference to the following Examples.

EXAMPLE I 24.2833 g of uranium metal was steam oxidized at 350° C. for 3 hours at a water flow rate of 0.222 ml min$^{-1}$ to produce 27.6610 of a uranium dioxide product that also contained some uranium hydride and residual uranium metal. This product was further oxidized in air at 450° C. for 3 hours to produce 28.6410 g $U_3O_8$ which was subsequently reduced in a hydrogen environment at 500° C. for 2 hours and resulted in 27.6124 g $UO_2$, ceramic grade.

EXAMPLE II 27.4126 g of uranium metal was steam oxidized at 350° C. for 3 hours at a water flow rate of 0.222 ml min$^{-1}$ to produce 31.3006 g of a uranium dioxide product including some uranium hydride and residual uranium metal. This product was further oxidized in air at 450° C. for 3 hours to produce 32.3805 g of $U_3O_3$ which was subsequently reduced in a hydrogen environment at 500° C. for 2 hours to produce 31.2112 g $UO_2$, ceramic grade.

An example similar to those above was performed with partly oxidized uranium metal, viz: uranium metal left in air for 10 months before use, but no discernable difference in the results was noted in the subsequent steam oxidation/air oxidation/reduction cycle from that of the other Examples. This indicates that at least the steam oxidation stage is highly tolerant to the surface conditions of the uranium metal.

Further examples with variations in conditions enabled the optimum conditions to be determined for the 30 g U scale to produce satisfactory results for pressing and sintering as fuel pellets, viz:

| Stage | Temp °C. | Gas/Gas flow ml min$^{-1}$ | Water flow ml min$^{-1}$ | Duration HRS |
|---|---|---|---|---|
| 1. (Steam Oxidation) | 350 | $N_2$/80 | 0.222 | 3 |
| 2. (Further Oxidation) | 450 | Air/300 | — | 3 |
| 3. (Reduction) | 500 | $H_2$/300 | — | 2 |

The above optimum conditions may be achieved at atmospheric pressure at each Stage. It will be appreciated that as the quantity of U metal to be converted changes, corresponding changes should be made to the gas and the water flow rates.

Although the above optimum conditions for 30 gU produce satisfactory results, the steam environment may be between 250° and 500° C., with a water flow rate of between 0.05 and 0.5 ml min$^{-1}$. The oxygen-containing environment might be up to 700° C. and preferably 450° C. The reducing environment might be up to 600° C. and preferably about 500° C. The process may be performed at atmospheric pressure.

In another example of the invention, the uranium metal was in the form of a vapor deposited layer on a substrate, e.g. up to 2 mm thick layer of uranium metal. The uranium metal layer may be treated by the process of the invention either on or after removal from the substrate.

I claim:

1. A process for the production of a ceramic material comprising sinterable uranium dioxide, the process comprising initially oxidizing uranium metal in a flowing steam/inert gas environment at a temperature between 250° C. and 500° C. to produce substantially uranium dioxide, the proportions of the steam and the inert gas in said environment and the flow rate thereof being arranged so that the formation of $U_3O_8$ is inhibited, then further oxidizing the steam-oxidised metal in an oxygen-containing environment at a temperature not exceeding 700° C. to produce $U_3O_8$, and subsequently reducing the $U_3O_8$ in a reducing environment at a temperature not exceeding 600° C. to produce a ceramic material comprising sinterable uranium dioxide.

2. A process as claimed in claim 1, wherein said temperature of the flowing steam/inert gas environment is about 350° C.

3. A process as claimed in claim 1, wherein the temperature of the oxygen-containing environment is about 450° C.

4. A process as claimed in claim 1, wherein the reducing environment temperature is about 500° C.

5. A process as claimed in claim 1, wherein the process is performed at atmospheric pressure.

6. A process as claimed in claim 1, wherein the oxygen-containing environment comprises an oxygen/nitrogen mixture.

7. A process as claimed in claim 1, wherein the uranium metal is in the partly-oxidized state.

8. A process as claimed in claim 1, wherein the uranium metal is in the form of a layer on a substrate.

9. A process as claimed in claim 1 including subsequently sintering the uranium dioxide to produce nuclear fuel pellets.

10. A process as claimed in claim 1, wherein the steam/inert gas environment comprises a water flow rate of between 0.05 and 0.5 ml min$^{-1}$ per 30 g of the uranium metal.

11. A process for the production of a ceramic material comprising sinterable uranium dioxide, the process comprising initially oxidizing uranium metal in a steam environment at a temperature of about 350° C. to produce substantially $UO_2$, the steam environment including nitrogen, then further oxidizing the steam-oxidized metal in an environment comprising an oxygen/nitrogen mixture, at about 450° C. to produce $U_3O_8$, and subsequently reducing the $U_3O_8$ in a reducing environment at about 500° C. to produce a ceramic material comprising sinterable uranium dioxide, the process being performed at substantially atmospheric pressure.

12. A process as claimed in claim 11, wherein the steam/nitrogen environment comprises a water flow rate of about 0.222 ml min$^{-1}$ per 30 g of the uranium metal.

* * * * *